United States Patent [19]
Grabherr et al.

[11] Patent Number: 5,768,954
[45] Date of Patent: Jun. 23, 1998

[54] GEAR CASE HAVING THREE LUBRICANT CHAMBERS

[75] Inventors: Werner Grabherr, Ravensburg; Helmut Sellmair, Noonenhorn, both of Germany

[73] Assignee: ZF Friedrichshafen AG, Friedrichshafen, Germany

[21] Appl. No.: 727,514

[22] PCT Filed: Apr. 15, 1995

[86] PCT No.: PCT/EP95/01418

§ 371 Date: Oct. 21, 1996

§ 102(e) Date: Oct. 21, 1996

[87] PCT Pub. No.: WO95/29349

PCT Pub. Date: Nov. 2, 1995

[30] Foreign Application Priority Data

Apr. 22, 1994 [DE] Germany .......................... 44 14 164.5

[51] Int. Cl.$^6$ .............................. F16H 57/04; F01M 9/06
[52] U.S. Cl. ........................ 74/606 R; 74/467; 184/11.1
[58] Field of Search .................. 74/606 A, 467, 74/606 R; 184/11.1, 13.1, 6.12

[56] References Cited

U.S. PATENT DOCUMENTS

| | | | |
|---|---|---|---|
| 1,105,773 | 8/1914 | Hans | 184/11.1 |
| 1,220,811 | 3/1917 | Alquist | 184/13.1 X |
| 3,618,711 | 11/1971 | Vollmer | 184/6.12 |
| 3,800,913 | 4/1974 | Schmitt | 74/606 R X |
| 4,217,926 | 8/1980 | Van Gorder | |
| 5,050,447 | 9/1991 | Hayakawa et al. | |
| 5,158,152 | 10/1992 | Nemoto et al. | |
| 5,161,644 | 11/1992 | Swenskowski et al. | 184/6.12 |

FOREIGN PATENT DOCUMENTS

| | | |
|---|---|---|
| 2443002 | 6/1980 | France . |
| 3906330 | 2/1990 | Germany . |
| 4126161 | 2/1992 | Germany . |
| 5071616 | 3/1993 | Japan ................................. 74/467 |
| 1397661 | 5/1988 | U.S.S.R. ............................. 74/467 |

OTHER PUBLICATIONS

ATZ Automobiltechnische Zietzchrift; Herbert Oberhaus, Fritz Heckert and Hermann Heinrichs; The New Automatic Transmission THM; 1982; pp. 157–160.

Database WPI; Week 5944 28 May 1980; Derwent Publications Ltd., London, GB; AN 425300 & SU, A, 679 754 (Cons Road Equip Res), 18 Aug. 1979.

Primary Examiner—Charles A. Marmor
Assistant Examiner—Mary Ann Battista
Attorney, Agent, or Firm—Davis and Bujold

[57] ABSTRACT

A gear case for a vehicle which has three casing chambers in which a first wall (11) separates the first (2) and the second (3) casing chambers from one another. The first wall (11) determines an upper lubricant level (22) while a lower lubricant level (21) of the gear casing is set by the volume of lubricant in the first (2) and the third (4) casing chambers.

4 Claims, 2 Drawing Sheets

GEAR CASE HAVING THREE LUBRICANT CHAMBERS

The invention relates to a gear case.

BACKGROUND OF THE INVENTION

Gear cases contain a lubricant sump. A pump conveys the lubricant from said sump to the places of the transmission to be lubricated. The volume of lubricant is here determined by the delivery of the pump and the number of places in the transmission to be lubricated. The lubricant level of the gear sump is set by two extremes: a lower level which ensures a reliable conveyance of the lubricant by the pump even at low temperatures; an upper level which is predetermined by the installation position of the rotating parts, such as shafts and clutches. It is known that when falling below the lower level suction noises and pressure drops result.

When exceeding the upper level, the rotating parts cause the lubricant to bubble which results in churning losses, discharge of lubricant from the vent and aging of the lubricant. Due to cramped conditions in the engine chamber, for example, in the case of a passenger car with front wheel drive and an engine installed across the travel direction, a reduction of the construction volume of the gear case altogether results. Besides, a small ground clearance of the vehicle causes the gear case to lose additional volume in the lower part, that is, in the area of the lubricant sump. A reduction of the construction volume together with a reduction of the lubricant volume means that the upper lubricant level approaches closer to the rotating parts.

ATZ Automobiltechnische Zeitschrift 84 (1982) 4 has disclosed a 3-gear automatic transmission. A lubricant sump and a second casing chamber are situated in a common gear case. The second casing chamber is above the lubricant sump. A temperature-controlled valve, in the form of a bimetal, is at the lowest point of the second casing chamber. At elevated temperatures of the lubricant the bimetal seals an aperture. At low temperatures of the lubricant the bimetal opens the aperture. During a cold operating state, the whole volume of the lubricant is thus in the lubricant sump. At elevated temperatures the additional volume of lubricant is held back in the second casing chamber. The high industrial expenditures and the functional safety are disadvantageous in this arrangement.

SUMMARY OF THE INVENTION

The problem on which the invention is based is to provide a gear case which ensures a safe filling state of the lubricant during all operating conditions.

According to the invention the problem is solved by the fact that, in a gear case of a vehicle, there are a first casing chamber with a lubricant sump from which the lubricant is conveyed by a pump to the places to be lubricated in the gear, a second casing chamber separated by a wall from the first casing chamber and a third casing chamber which is connected with the first by an aperture and is closed with respect to the second. The height of the wall between the first and second casing chambers sets an upper lubricant level so that an increase in volume of the lubricant resulting from an elevated temperature flows into the second casing chamber. Said lubricant volume is conveyed by a bucket wheel in the second casing chamber. A lower lubricant level is set by the lubricant volumes in the first and second casing chambers.

The solution, according to the invention, has the advantage that the lubricant volume is increased by using the installation space already existing in the gear case as an added casing chamber for the lubricant sump.

Another advantage of the solution, according to the invention, consists in that the upper lubricant level is set by the height of the wall, between the first and second casing chambers, so that an increase in volume of the lubricant flows into the second casing chamber and is conveyed from there by a bucket wheel. This ensures that the lubricant level does not reach the rotating parts during any state of operation.

In development of the invention it is proposed that the lubricant volume conveyed by the bucket wheel be transported to containers and that these have a discharge aperture. This affords the advantage that the lubricant volume conveyed by the bucket wheel does not immediately flow back again into the lubricant sump. Due to the diameter of the discharge aperture, the time delay by which the lubricant flows back into the lubricant sump can be adjusted, and thus the filling behavior of the container can be controlled.

In another development it is proposed that the container be within the gear case. This ensures that in case of an eventual leakage of the container, no lubricant leaks into the environment.

In another embodiment, it is proposed that the wall between the first and second chambers has a passage so that the different lubricant levels can compensate each other when the vehicle stands still.

BRIEF DESCRIPTION OF THE DRAWING(S)

DESCRIPTION OF THE PREFERRED EMBODIMENT(S)

Figure 1:
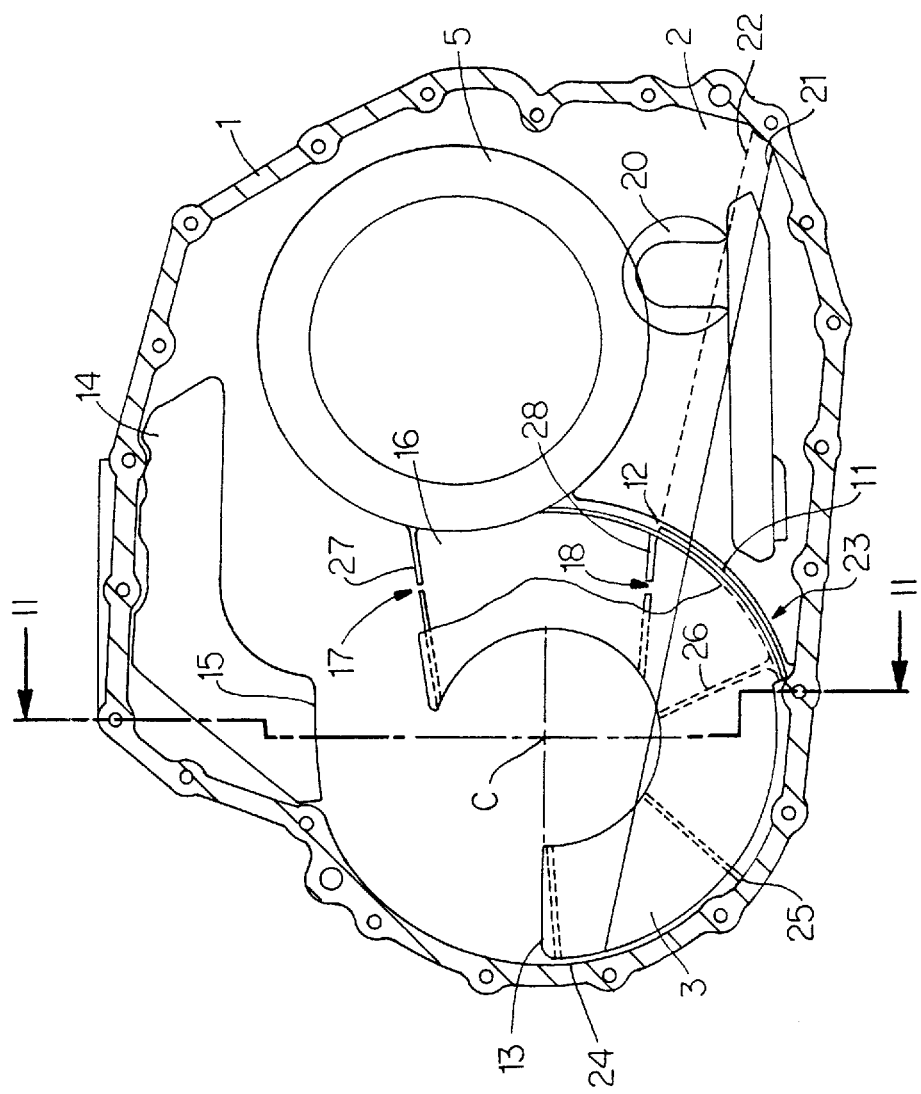
FIG. 1 shows a cross section of a gear case.

A gear case 1 is shown in FIG. 1. Within the gear case 1 is a first casing chamber 2, a second casing chamber 3, a container 14, a container 16, rotating parts 5, such as shafts and clutches, and a third casing chamber 4 which, in the drawing, is behind the second casing chamber 3. The suction filter 20 of a pump is diagrammatically shown in the first casing chamber 2. In the second casing chamber 3 is a bucket wheel 6 not shown. The central point C of the bucket wheel 6, is shown. The bucket wheel 6 can be seen in FIG. 2. Behind the bucket wheel 6 is a second wall 13. Said wall 13 separates the second casing chamber 3 and the third casing chamber 4. The third casing chamber 4 is thus screened, in FIG. 1, by the wall 13. Between the first casing chamber 2 and the second casing chamber 3 is a first wall 11. By the height of the wall 11, overflow edge 12 can set the upper lubricant level 22 of the first casing member 2. The upper lubricant level 22 is shown in broken line, an inclined installation position of the gear being indicated by an inclination in relation to the horizontal lines. The wall 11 shows a communication passage 23 so that different lubricant levels in the first and second casing chambers 2 and 3 can be compensated when the vehicle stands still. The third casing chamber 4 is connected with the first casing chamber 2 by an aperture 19. Said aperture 19 can be seen in FIG. 2. Radial ribs lead from the central point C of the bucket wheel 6, not shown, to the gear case 1. Five ribs 24 to 28 are shown. The ribs serve to reinforce the gear case 1. Said ribs form chambers. The third casing chamber 4 results from several chambers being interconnected by holes, for example, or by reducing the height of the ribs 25 and 26.

Above the bucket wheel 6 is a container 14, not shown. The lubricant volume conveyed by the bucket wheel 6 is guided, via baffles not shown, into the container 14. The container 14 has one aperture 15 on the container bottom. The lubricant flows back into the lubricant sump via the aperture 15. The amount of lubricant flowing out can be controlled by the diameter of the aperture 15. In the turning range of the bucket wheel 6, not shown, is another container 16. The container 16 can be inserted in the gear case 1 as an additional part or by using the space between both ribs 27 and 28. The container 16 has on its top end, an aperture 17 for intake and, on its lower part, an aperture 18 through which the lubricant can flow out.

The arrangement operates as follows: during a cold operating state and when the vehicle stands still, the same lubricant level appears in all three casing chambers. After the starting operation and once the bucket wheel 6 is turning, the latter transports the lubricant volume that is in the second casing chamber 3 to the container 14 or container 16. Thereafter, the bucket wheel 6 can rotate freely. As result of the diameter of the passage 23 only a small volume of lubricant flows from the first casing chamber 2 to the second casing chamber 3. From the additional lubricant volume of the third casing chamber 4, it is ensured that the suction filter 20 of the pump is always covered with lubricant, lower lubricant level 21. If the temperature of the lubricant rises, during operation, then the flowability of the lubricant improves. Due to the increased reflux of the lubricant from the lubrication places into the gear sump and the temperature expansion of the lubricant, its level rises in the gear. If the lubricant volume reaches an upper level 22, then the additional lubricant volume flows, via the overflow edge 12, to the second casing chamber 3. The lubricant volume flowing into the second casing chamber 3 is transported by the bucket wheel 6 to the container 14 or to the container 16. It is thus ensured that the upper lubricant level 22 remains always below the rotating parts 5.

Figure 2:
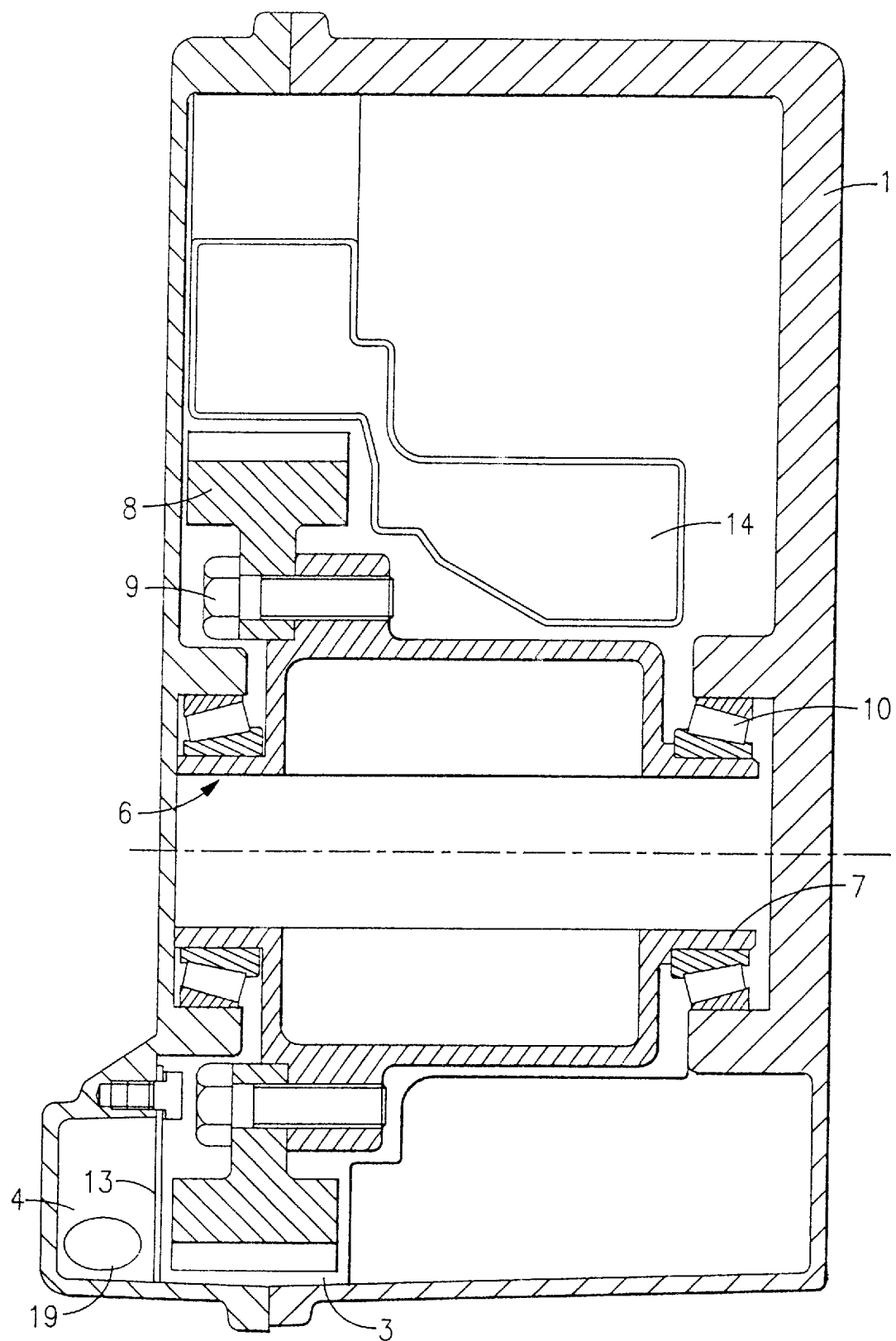
FIG. 2 shows a cutaway view of the gear case.

In FIG. 2 a cutaway view of the gear, along the intersecting lines II—II, is shown. The bucket wheel 6 is shown in the gear case 1. The bucket wheel 6 rests upon roller bearings 10 of the gear case 1. The bucket wheel 6 is comprised of a differential cage 7 and a spur gear 8. The spur gear 8 is secured to the differential case 7 by means of screws 9. The bucket wheel 6 sits in the second casing chamber 3. A wall 13 separates the second casing chamber 3 and the third casing chamber 4. The wall 13 can be designed, for example, as a sheet-metal part which abuts against the ribs 24 to 28 and can be secured by means of screws. The third casing chamber 4 is connected with the first casing chamber 2 by an aperture 19. The container 14 is shown above the bucket wheel 6.

We claim:

1. A gear case (1) having first, second and third casing chambers (2–4), said first casing chamber (2) being separated from said second casing chamber (3) by a first wall (11), a height of said first wall (11) defining an upper lubricant level (22) so that any increase in a volume of lubricant, due to a temperature increase, causes said lubricant to flow from said first casing chamber (2) into said second casing chamber (3), and a basket wheel (6) being located within said second casing chamber (3) for scooping and conveying lubricant located therein, said third casing chamber (4) being separated from said second casing chamber (3) by a second wall (13), and said third casing chamber (4) being connected with said first casing chamber (2) by an aperture (19);

wherein said third casing chamber is formed from a plurality of individual chambers which are separated from one another by ribs (24–28), and each of said plurality of individual chambers are connected with one other by a passage, and a lower lubricant level (21) of said gear casing is defined by a volume of lubricant in said first and said third casing chambers (2 and 4).

2. The gear case according to claim 1, wherein said first wall (11), located between said first and said second casing chambers (2, 3), has a passage (23) which allows for compensation of different lubricant levels, in said first and second casing chambers (2, 3), when said gear casing is inactive.

3. A gear case (1) in a vehicle having a first casing chamber (2) having a lubricant sump from which lubricant is conveyed via a pump (20) to places in said gear case to be lubricated, a second casing chamber (3) being separated from said first casing chamber (2) by a first wall (11), a third casing chamber (4) being connected with said first casing chamber (2) by an aperture (19) and being separated from said second casing chamber (3) by a second wall (13), a height of said first wall (11) between said first and second casing chambers (2, 3) defining an upper lubricant level (22) so that any increase in a volume of lubricant, resulting from an elevation in lubricant temperature, flows into said second casing chamber (3) for conveyance by a bucket wheel (6) being located in said second casing chamber (3), and a lower lubricant level (21) being defined by a lubricant volume in said first and said third casing chambers (2, 4); and lubricant from said bucket wheel (6) is conveyed to containers (14, 16) which have a discharge aperture (15, 18).

4. The gear case according to claim 3, wherein said containers (14, 16) are located within said gear case (1).

* * * * *